Feb. 19, 1924.

R. GRAVES

HEATING DEVICE

Filed Feb. 1, 1921

WITNESSES

INVENTOR

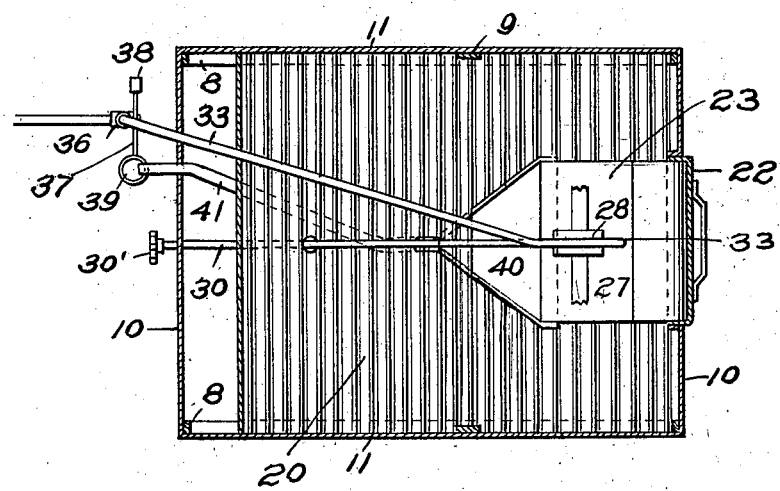
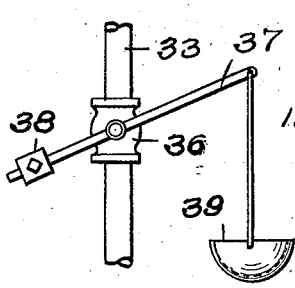
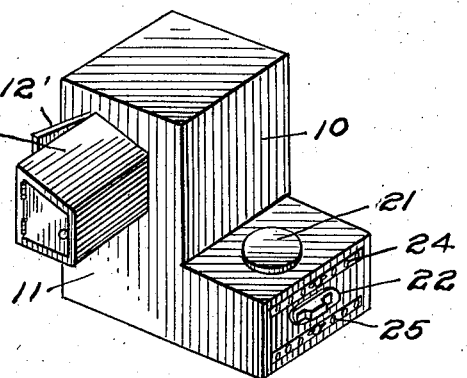
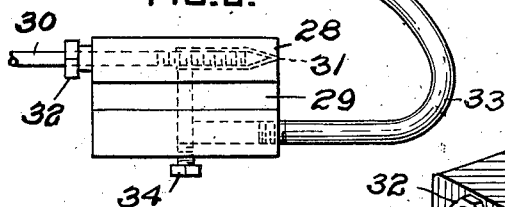
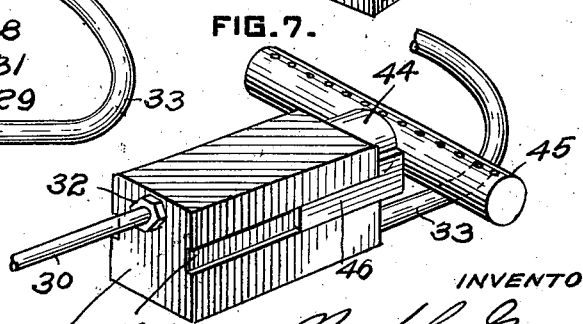

Patented Feb. 19, 1924.

1,483,970

UNITED STATES PATENT OFFICE.

RANDEL GRAVES, OF PITTSBURGH, PENNSYLVANIA.

HEATING DEVICE.

Application filed February 1, 1921. Serial No. 441,568.

*To all whom it may concern:*

Be it known that I, RANDEL GRAVES, a citizen of the United States, residing at Pittsburgh, in the county of Allegheny and State of Pennsylvania, have invented certain new and useful Improvements in Heating Devices, of which the following is a specification.

This invention relates to an improvement in heating devices of the kind adapted for both heating and cooking.

The object of my invention is to provide a cheap, simple and efficient form of stove which may be easily made and assembled, and which, while primarily a heating stove, may be used for cooking and baking, and which may be adapted for burning liquid, solid, or gaseous fuel.

A further object is to provide a stove of this type having a removable oven which may be taken out of the stove when not in use, thereby increasing its life by preventing it from being burned when the stove is used as a heater.

Further objects of the invention are to provide means for controlling the distribution of heat to secure the best results for heating or for baking purposes, and controlling to some extent the temperature of the oven; and the provision of safety means for controlling the fuel supply when liquid hydrocarbon fuel is used, to prevent the stove from becoming flooded with unburned fuel.

The construction and operation of my invention may be readily understood by reference to the accompanying drawings, in which:

Fig. 3 is a horizontal section on line 3—3 of Fig. 1;

Fig. 4 is a perspective on a smaller scale of the stove, with the oven partly removed;

Fig. 5 is a detail of the automatic fuel cut-off valve employed when liquid fuel is being burned;

Fig. 6 is a side elevation of the form of hydrocarbon fuel burner which I preferably employ; and Fig. 7 shows in perspective the burner and an attachment therefor, said attachment being used when gas or very volatile liquid fuel is being burned.

Figure 1:
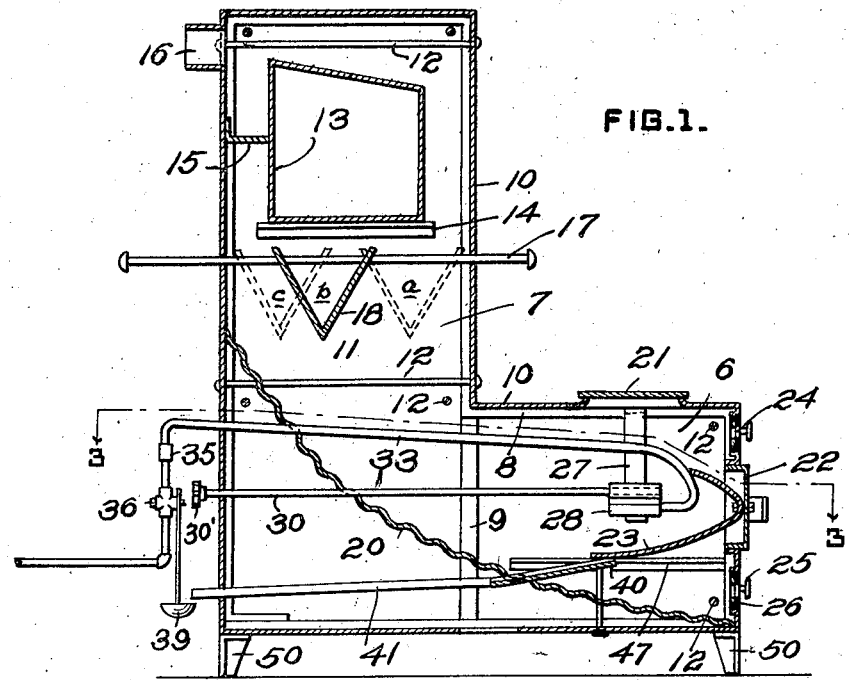
Fig. 1 is a vertical transverse section through a stove embodying my invention.
Figure 2:
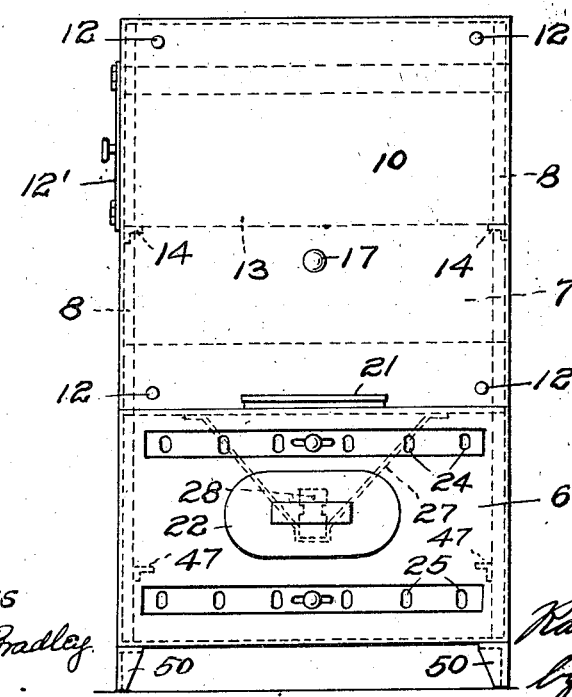
Fig. 2 is a front elevation thereof.

In the drawings, I have shown the stove as being constructed of sheet metal, although I do not limit myself to sheet metal construction, as the stove may be formed of cast metal, or otherwise formed. The stove is L-shaped, having a horizontal forwardly extending portion 6 and a vertically extending rear portion 7.

When the stove is formed of sheet metal, as shown, it is preferably constructed about two substantially rigid end frame members 8 formed of relatively heavy strip metal, and shaped to conform to the shape of the stove. The end frame members are braced at 9. Bent around the end frame members 8, is a sheet of stove metal 10, forming the front, back, top and bottom surfaces of the stove. This sheet is formed with the necessary openings and perforations therein before being applied to the frame members. The sides or ends of the stove are closed by sheets of metal 11 of proper shape and area. Bolts 12 passing through various parts of the stove serve to hold them in place and give rigidity thereto.

In one of the side members 11 is an opening provided with a door 12'. A sheet metal oven 13 adapted to slide through this opening is provided, and at 14 are angle bars or other suitable means 15 for holding the oven in place. The door 12, when closed, holds the oven from coming out. Secured to the back wall and extending forward sufficiently to reach or come close to the oven when it is in the stove, is the horizontal baffle 15. At 16 is the flue opening for the stove.

In the vertical portion 7 of the stove, and beneath the position of the oven, is a reciprocable rod 17 on which is secured a V-shaped deflector 18 which extends across the oven and maintains a horizontal position by reason of its ends contacting with the sides 11. By reciprocating rod 17, the position of deflector 18 may be shifted.

Supported within the lower portion of the oven is a heat reflecting plate 20 which is preferably formed of corrugated sheet metal. It extends from the back of the stove to the front, and is inclined toward the front, as shown. It extends across the width of the interior of the stove.

Formed in the top of the portion 6 is an opening having a lid 21, forming a cooking opening for support of utensils on the stove. If desired, more than a single cooking means could be provided. In the front of portion 6 is a removable door or closure 22 having a handle, and to the inner surface of which is secured, preferably by means of bolts, a heat reflecting plate 23, which is substantially V-shaped, its width being substantially that of the door, so that it may be withdrawn from the stove by removing said door. Above and below closure 22 are air ports 24 and 25, behind which are registering slide plates for controlling the admission of air, the construction of the slides being well known in the stove art. Lower ports 25 are preferably placed in a removable plate 26, which removable plate facilitates the cleaning of the interior of the stove. By proper control of ports 24 and 25, air may be supplied from the top or bottom, or at both top and bottom.

Supported in the stove over the deflector plate 23, preferably by means of hanger 27 secured to the top of the portion 6, is a fuel burner 28. The burner 28 is shown in detail in Figs. 6 and 7, and comprises a body having longitudinal grooves 29 therein. A fuel control rod 30 is threaded into body 28 and moves a needle valve for controlling the escape of fuel from opening 31. A packing gland 32 is provided for the control rod 30. Fuel is admitted to the body 28 through a pipe 33 which extends downwardly in front of opening 31. A drain for draining sediment from the fuel passages in body 28 is provided by screw 34. The rod 30 extends rearwardly through reflecting plate 20 and the back of the stove, and has a suitable hand wheel or similar actuating device 30'. Any desired number of such burners can be employed.

Fuel pipe 33 also extends rearwardly, as shown in Fig. 3. At 35 is a check valve permitting the fuel to go only in one direction through pipe 33. At 36 is a globe or other suitable valve, having a lever 37 on the operating stem thereof. One end of the lever carries a small adjustable weight 38, and from the other end of the lever is suspended a cup or receptacle 39.

Extending beneath plate 23 is a drip pan 40 which is inclined toward a pipe 41, into which it delivers, and this pipe extends over cup 39. Should it happen that the stove were lighted when burning crude oil, kerosene, or other liquid fuel, and then left unattended and the small fuel opening 31 become clogged with some foreign particle, permitting the flame to go out, and then the impediment in the burner later became removed, so that the fuel could escape without burning, the escaping fuel would fall on plate 23, flow to drip pan 40, and be emptied into cup 39. A very small quantity of fuel in the pan or cup 39 would actuate lever 37 to close valve 36.

If it is desired that gas or extremely volatile liquids, such as gasoline, be burned, the attachment shown in Fig. 7, comprising a tubular member 44 adapted to fit over the opening 31 in burner 28, is employed, this tubular member having a transverse perforated burner 45. Arms 46 secured to member 44 engage in grooves 29 to hold this attachment in position.

If solid fuel is to be burned in the stove, burner 28 and plate 23, together with drip pan 40, are removed and grates, not shown, can be placed on angle bars 47.

In operation, assuming that kerosene is the fuel being burned, the burner 28 is as shown in Fig. 6. Pipe 33 connects with a suitable elevated tank, not shown. Hand wheel 30' is turned to properly adjust the burner, and the oil, coming out opening 31, is lighted. It will quickly heat the portion of pipe 33 extending in front of it, vaporizing the fuel before it reaches the burner opening. The flame will blow forwardly, hit plate 23, mixing any unburned gases with the air. Check valve 35 prevents any pressure in pipe 33 being communicated to the supply tank.

The heated air and gases from the burner heat the top of portion 6, and pass rearwardly, deflector 20 serving to deflect radiated heat and the heated gases forwardly and upwardly.

If it is desired to bake, the oven 13 is put in the stove, and deflector 18 is moved to dotted line position a. The heated gases and air then hit the deflector 18, and are directed rearwardly. Baffle 15 prevents the gases from going behind the oven and out the flue, so they must pass beneath the oven and up the front side and over the top thereof. To moderate the heat of the oven, deflector 18 is moved to full line position b. When the stove is used for heating purposes only, the oven is preferably removed, to prevent burning, and the deflector 18 shifted to dotted line position c. In this position, it throws the heated gases forwardly against the front of the stove.

The stove may be supported on suitable legs 50.

While I have described the preferred form of my invention, it will be obvious that various changes may be made therein.

What I claim is:

1. A stove comprising a heating means, a vertical portion having front and rear walls above the heating means, and a slidably supported V-shaped deflector in said vertical portion movable back and forth to deflect the heat toward the front or rear walls.

2. A stove having a heating means in the lower portion thereof, a vertical portion above and to the rear of said heating means, an inclined reflecting member extending from beneath the heating means upwardly to direct heated gases upwardly into the vertical portion, and a movable V-shaped deflector in the vertical portion for controlling the direction of passage through the upper portion, said deflector being movable to and from a central position directly under the oven to and from a position at either side of the oven.

3. A stove having a heating means, a vertically extending portion having an outlet at one side of the upper part thereof, an oven in said vertically extending portion, a baffle wall on said stove and extending along one side of the oven below the outlet, whereby a direct passage of heated gases to the outlet is prevented, and means for directing a flow of heated gases around said oven including a V-shaped deflector by means of which a greater or lesser area of the oven may be heated by direct contact with the gases.

4. A stove which is L-shaped having a horizontal front portion and a vertically extending rear portion, an inclined deflecting plate in the lower portion of the stove, a removable door on the front of said horizontal portion, a deflector mounted on said door, and a burner disposed over said deflector.

5. A stove which is L-shaped having a horizontal front portion and a vertically extending rear portion, an inclined deflecting plate in the lower portion of the stove, a removable door on the front of said horizontal portion, a deflector mounted on said door, a burner disposed over said deflector, and air inlet means above and below said burner.

6. A stove which is L-shaped having a horizontal front portion and a vertically extending rear portion, an inclined deflecting plate in the lower portion of the stove, a removable door on the front of said horizontal portion, a deflector mounted on said door, a liquid fuel burner above the deflector on said door, a fuel pipe for said burner, a drip pan into which any fuel falling on the deflector flows, and valve actuating means into which the fuel collected in said drip pan is delivered to shut off the flow through said feed pipe.

In testimony whereof I affix my signature in presence of two witnesses.

RANDEL GRAVES.

Witnesses:
 Lois Wineman,
 Wm. H. Parmelee.